(12) United States Patent
Suzuki et al.

(10) Patent No.: US 10,907,745 B2
(45) Date of Patent: Feb. 2, 2021

(54) PRESSURE REGULATOR VALVE

(71) Applicant: KAWASAKI JUKOGYO KABUSHIKI KAISHA, Kobe (JP)

(72) Inventors: Yutaka Suzuki, Kobe (JP); Hiroshi Yamashita, Kobe (JP); Kazumasa Sakai, Kakogawa (JP); Kodai Kato, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 2 days.

(21) Appl. No.: 16/316,008

(22) PCT Filed: Jun. 12, 2017

(86) PCT No.: PCT/JP2017/021657
§ 371 (c)(1),
(2) Date: Jan. 7, 2019

(87) PCT Pub. No.: WO2018/008335
PCT Pub. Date: Jan. 11, 2018

(65) Prior Publication Data
US 2019/0277418 A1    Sep. 12, 2019

(30) Foreign Application Priority Data

Jul. 7, 2016    (JP) .................... 2016-135052

(51) Int. Cl.
*F16K 31/12*    (2006.01)
*F16K 17/30*    (2006.01)
(Continued)

(52) U.S. Cl.
CPC .............. *F16K 17/30* (2013.01); *F16K 27/08* (2013.01); *G05D 16/10* (2013.01); *Y10T 137/7811* (2015.04)

(58) Field of Classification Search
CPC ........... Y10T 137/7808; Y10T 137/781; Y10T 137/7811; Y10T 137/7819
See application file for complete search history.

(56) References Cited

U.S. PATENT DOCUMENTS 2,027,762 A * 1/1936 Becker .................... F16K 17/22
                                                137/498
2,563,192 A * 8/1951 Scruggs ................. G05D 16/10
                                                137/102

(Continued)

FOREIGN PATENT DOCUMENTS

JP          H10-6950 A        1/1998
JP          2005-149172 A     6/2005
(Continued)

*Primary Examiner* — Robert K Arundale
(74) *Attorney, Agent, or Firm* — Oliff PLC (57) ABSTRACT

A pressure regulator valve includes: a housing including a base, a cover, and a body; a valve element configured to open and close a valve passage by moving between a closed position and an open position, the valve element being further configured to reduce a primary pressure to a secondary pressure and receive the secondary pressure by which the valve element moves toward the closed position; a biasing unit accommodated in an accommodating space formed between the body and the cover, the biasing unit being configured to bias the valve element such that the valve element moves toward the open position; a first sealing member provided at a gap between the base and the body; and a second sealing member provided a gap between the base and the cover and made of synthetic rubber. The second sealing member is arranged away from the body.

4 Claims, 4 Drawing Sheets

(51) Int. Cl.
*F16K 27/08* (2006.01)
*G05D 16/10* (2006.01)

(56) References Cited

U.S. PATENT DOCUMENTS

| | | | | |
|---|---|---|---|---|
| 2,680,454 A | * | 6/1954 | MacGlashan, Jr. | G05D 16/10 137/505.28 |
| 2,700,983 A | * | 2/1955 | Bryant | F16K 17/0473 137/505.11 |
| 3,087,705 A | * | 4/1963 | Hamilton | F16K 39/022 251/356 |
| 3,698,425 A | * | 10/1972 | Fisher | B63C 11/2209 137/505.25 |
| 4,015,630 A | * | 4/1977 | Contreras | B63C 11/2245 137/505.25 |
| 4,226,257 A | * | 10/1980 | Trinkwalder | A62B 9/02 137/505.25 |
| 5,662,100 A | * | 9/1997 | Fox | G05B 19/10 128/205.24 |
| 5,860,447 A | * | 1/1999 | Chu | G05D 16/103 137/493.8 |
| 6,257,275 B1 | * | 7/2001 | Furbish | G05D 16/187 137/505 |
| 7,798,169 B2 | * | 9/2010 | Tai | F16K 1/307 137/505.28 |
| 2005/0152796 A1 | * | 7/2005 | Morrison | G05D 16/103 417/440 |
| 2008/0302428 A1 | * | 12/2008 | Nomichi | F16K 31/1221 137/500 |
| 2013/0263942 A1 | | 10/2013 | Ninomiya et al. | |

FOREIGN PATENT DOCUMENTS

| | | |
|---|---|---|
| JP | 2006-146776 A | 6/2006 |
| JP | 2006-260385 A | 9/2006 |
| JP | 2010-255642 A | 11/2010 |
| WO | 2012/056647 A1 | 5/2012 |
| WO | 2015/052863 A1 | 4/2015 |

* cited by examiner

PRESSURE REGULATOR VALVE

TECHNICAL FIELD

The present invention relates to a pressure regulator valve configured to reduce the pressure of a working gas flowing through a valve passage.

BACKGROUND ART

A pressure regulator valve configured to reduce the pressure of a gas flowing through a valve passage connected to a primary port and a secondary port has been put to practical use. Known as one example of the pressure regulator valve is a pressure regulator valve of PTL 1. The pressure regulator valve of PTL 1 includes a housing constituted by a housing block, a supporting portion, and a cover. The housing block of the housing includes a valve passage. The housing block further includes an opening connected to the valve passage, and a tip end portion of the supporting portion is inserted into the opening. A flange is formed at an intermediate portion of the supporting portion and is sandwiched between the housing block and the cover. Therefore, by fastening the cover to the housing block, the supporting portion and the cover are fixed to the housing block. A gas seal is provided between the housing block and the tip end portion of the supporting portion and prevents a working gas, flowing through the valve passage, from leaking from between the housing block and the supporting portion.

CITATION LIST

Patent Literature

PTL 1: International Publication No. 2012/056647

SUMMARY OF INVENTION

Technical Problem

According to the pressure regulator valve of PTL 1, the flange of the supporting portion is exposed to an outside and is required to be accommodated in the cover. If the flange of the supporting portion is accommodated in the cover, a liquid, such as rain water, may flow in from between the cover and the housing block, and the inflow liquid is introduced to a spring accommodating space through between the cover and the flange. To prevent this, a waterproof seal may be provided between the cover and the housing block.

The waterproof seal is constituted by, for example, an O ring and is provided so as to be accommodated in a step portion formed at an inner peripheral edge of an opening end of the cover. The waterproof seal is designed such that: the waterproof seal is crushed by providing the cover at the housing block; and by this crushing, the waterproof seal also contacts an outer peripheral surface of the flange of the supporting portion. With this, a gap between the cover and the housing block and a gap between the flange and the cover are sealed. Thus, the rain water flowing in to between the cover and the housing block is prevented from being introduced to the spring accommodating space.

As above, the waterproof seal prevents the inflow of the rain water. However, since the waterproof seal contacts the outer peripheral surface of the flange, the waterproof seal also prevents the leakage of the gas, slightly leaking from the gas seal, to an outside. Therefore, the gas leaking from the gas seal is accumulated between the waterproof seal and the gas seal, and the pressure of the gas between the waterproof seal and the gas seal increases. In this case, the supporting portion is lifted by the accumulated gas, and this may deteriorate the functions of the pressure regulator valve or damage the pressure regulator valve.

An object of the present invention is to provide a pressure regulator valve capable of preventing pressure increase while obtaining waterproof performance.

Solution to Problem

A pressure regulator valve of the present invention includes: a housing including a base including a valve passage through which a working gas flows, a tubular body attached to the base, and a cover attached to the base so as to cover the body; a valve element configured to open and close the valve passage by moving between a closed position where the valve element closes the valve passage and an open position where the valve element opens the valve passage, the valve element being further configured to reduce a primary pressure to a secondary pressure and receive the secondary pressure by which the valve element moves toward the closed position; a biasing unit accommodated in an accommodating space formed between the body and the cover, the biasing unit being configured to bias the valve element such that the valve element moves toward the open position; a first sealing member provided between the base and the body; and a second sealing member provided between the base and the cover and made of synthetic rubber, wherein the second sealing member is arranged away from the body.

According to the present invention, a gap between the base and the cover can be sealed without closing a gap between the cover and the body. With this, a liquid, such as rain water, can be prevented from flowing into the valve passage and the accommodating space from between the base and the cover, and a gas leaking from the first sealing member can be introduced to the accommodating space. Therefore, a pressure increase caused when the working gas leaking from the first sealing member is accumulated between the base and the body can be prevented from occurring.

In the above invention, the pressure regulator valve may be configured such that: the cover includes an atmosphere communication hole through which the accommodating space communicates with an atmosphere; the atmosphere communication hole is closed by a sealing member; and the sealing member allows a gas to flow therethrough and prevents a liquid from flowing therethrough.

According to the above configuration, the working gas accumulated in the accommodating space can be released to the atmosphere, and this can prevent a pressure increase. Further, since the atmosphere communication hole is closed by the sealing member, a liquid, such as rain water, can be prevented from flowing in through the atmosphere communication hole.

A pressure regulator valve of the present invention includes: a housing including a base including a valve passage through which a working gas flows, a tubular body attached to the base, and a cover attached to the base so as to cover the body; a valve element configured to open and close the valve passage by moving between a closed position where the valve element closes the valve passage and an open position where the valve element opens the valve passage, the valve element being further configured to reduce a primary pressure to a secondary pressure and receive the secondary pressure by which the valve element moves toward the closed position; a biasing unit accommodated in an accommodating space formed between the body and the cover, the biasing unit being configured to bias the valve element such that the valve element moves toward the open position; a first sealing member provided between the base and the body to seal the valve passage; and a second sealing member provided between the base and the cover, wherein: the second sealing member is made of a porous material which allows a gas to flow therethrough and prevents a liquid from flowing therethrough; and the second sealing member is arranged so as to contact the body.

According to the above configuration, since the gap between the base and the cover can be sealed in terms of a liquid, a liquid, such as rain water, can be prevented from flowing into the valve passage and the accommodating space through between the base and the cover. Further, by using a sealing member made of the porous material as the second sealing member, the working gas can be released from between the base and the cover through the second sealing member to the atmosphere. Therefore, the pressure increase caused when the working gas leaking from the first sealing member is accumulated between the base and the body can be prevented from occurring.

A pressure regulator valve of the present invention includes: a housing including a base including a valve passage through which a working gas flows, a tubular body attached to the base, and a cover attached to the base so as to cover the body; a valve element configured to open and close the valve passage by moving between a closed position where the valve element closes the valve passage and an open position where the valve element opens the valve passage, the valve element being further configured to reduce a primary pressure to a secondary pressure and receive the secondary pressure by which the valve element moves toward the closed position; a biasing unit accommodated in an accommodating space formed between the body and the cover, the biasing unit being configured to bias the valve element such that the valve element moves toward the open position; a first sealing member provided at a gap between the base and the body; and a second sealing member provided at a gap between the base and the cover and made of synthetic rubber, wherein: the second sealing member is arranged so as to contact the body; and the body includes a pressure release hole connecting the accommodating space and a gap between the base and the body, the gap being a portion located at an opposite side of the valve passage across the first sealing member.

According to the above configuration, since the gap between the base and the cover can be sealed in terms of a liquid, a liquid, such as rain water, can be prevented from flowing into the valve passage and the accommodating space through between the base and the cover. Further, by forming the pressure release hole at the body, the working gas can be introduced from between the base and the cover to the accommodating space to be released to the atmosphere. Therefore, the pressure increase caused when the working gas leaking from the first sealing member is accumulated between the base and the body can be prevented from occurring.

Advantageous Effects of Invention

The present invention can prevent a pressure increase while obtaining waterproof performance.

The above object, other objects, features, and advantages of the present invention will be made clear by the following detailed explanation of preferred embodiments with reference to the attached drawings.

DESCRIPTION OF EMBODIMENTS

Hereinafter, pressure regulator valves 1 and 1A according to Embodiments 1 and 2 of the present invention will be explained with reference to the drawings. It should be noted that directions stated in the following explanations are used for convenience of explanation, and directions and the like of components of the present invention are not limited. Further, each of the pressure regulator valves 1 and 1A explained below is just one embodiment of the present invention. Therefore, the present invention is not limited to the embodiments, and additions, deletions, and modifications may be made within the scope of the present invention.

Embodiment 1

Figure 1:
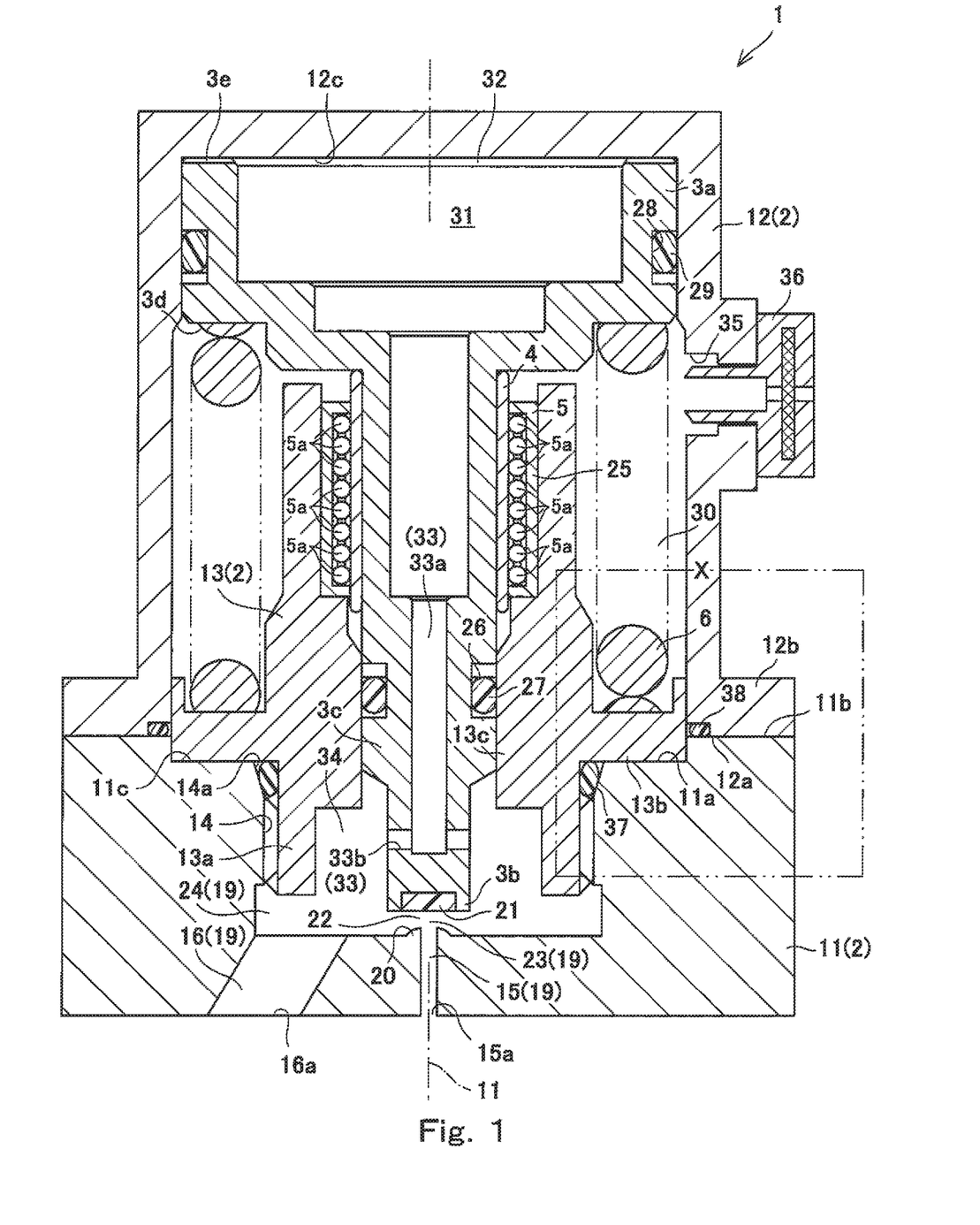
FIG. 1 is a sectional view showing a pressure regulator valve of Embodiment 1.

The pressure regulator valve 1 is a valve used to reduce the pressure of a working gas, mainly a high-pressure gas, to a working pressure or an atmospheric pressure. The pressure regulator valve is used by being interposed on, for example, a supply channel connected to a gas supply source, such as a high-pressure tank, or a discharge channel connected to the atmosphere. As shown in FIG. 1, the pressure regulator valve 1 includes a housing 2, a valve element 3, a tubular reinforcing body 4, a ball bearing 5, and a spring member 6.

The housing 2 is constituted by three members that are a base 11, a cover 12, and a body 13. It should be noted that the number of members of the housing 2 is not necessarily limited to three and may be four or more. The base 11 includes an insertion hole 14, a primary passage 15, and a secondary passage 16. The insertion hole 14 is formed along an axis L1 of the pressure regulator valve 1 on an attachment surface 11c that is an upper surface of the base 11. The insertion hole 14 includes an opening 14a on the attachment surface 11c. The insertion hole 14 is a bottomed hole. The primary passage 15 and the secondary passage 16 are formed at a bottom portion that defines the insertion hole 14. The primary passage 15 is formed along the axis L1 of the pressure regulator valve 1 in an upper-lower direction and is connected to a primary port 15a into which the working gas flows. The secondary passage 16 is formed at a position away from the primary passage 15 in a radially outer direction and extends obliquely downward in a direction away from the primary passage 15. The primary passage 15 and the secondary passage 16 are connected to the primary port 15a and a secondary port 16a, respectively. The primary passage 15, the secondary passage 16, a below-described primary region 23, and a below-described secondary region 24 (the regions 23 and 24 are regions included in the insertion hole 14) constitute a valve passage 19. An annular concave portion 11a is formed around the opening 14a of the base 11. The concave portion 11a is lower than a portion located at a radially outer side of the concave portion 11a.

The attachment surface 11c of the base 11 is formed in a step shape. The cover 12 is provided so as to contact a step upper portion 11b and cover the opening 14a. The step upper portion 11b is the portion located at a radially outer side of the concave portion 11a and is located higher than the concave portion 11a.

The cover 12 is formed in a substantially cylindrical shape including a ceiling and opens downward. The cover 12 is formed such that an inner diameter thereof is substantially equal to an opening diameter of the concave portion 11a of the base 11. A flange 12b is formed at an opening end portion 12a of the cover 12 over the entire periphery in a circumferential direction so as to extend in the radially outer direction. The flange 12b is placed on the step upper portion 11b of the base 11 and is fixed to the base 11 by a fastening member, such as a bolt (not shown). With this, the cover 12 is attached so as to contact the attachment surface 11c of the base 11. The cover 12 covers the below-described body 13, and the body 13 is accommodated in the cover 12.

The body 13 is formed in a substantially cylindrical shape, and a tip end portion 13a of the body 13 is inserted into and threadedly engaged with the insertion hole 14. An intermediate portion of the body 13 projects from the insertion hole 14 to an inside of the cover 12, and a flange 13b is formed at the intermediate portion of the body 13 so as to extend in the radially outer direction. The flange 13b is formed such that an outer diameter thereof is substantially equal to an inner diameter of the concave portion 11a of the base 11. Apart of the flange 13b is fitted in the concave portion 11a. With this, a lower surface of the flange 13b faces the attachment surface 11c of the base 11. An upper portion of the flange 13b projects from the concave portion 11a to the inside of the cover 12 and is fitted to the cover 12 such that an outer peripheral surface thereof faces an inner peripheral surface of an opening-side portion of the cover 12. The body 13 arranged as above includes a through hole formed around the axis L1 and extending in the upper-lower direction. The valve element 3 is inserted into the through hole of the body 13 so as to be able to reciprocate in the upper-lower direction along the axis L1.

The valve element 3 is made of a soft material, such as an aluminum alloy, and is formed in a substantially columnar shape. Abase portion 3a of the valve element 3 projects in the radially outer direction beyond a remaining portion of the valve element 3. The remaining portion of the valve element 3 is inserted into the body 13. A tip end portion 3b of the valve element 3 projects downward from the tip end portion 13a of the body 13. The tip end portion 3b is opposed to an opening of the primary passage 15, and an annular projecting piece 20 is formed around the opening of the primary passage 15 so as to surround the opening. The valve element 3 includes a seat portion 21 at a position of the tip end portion 3b which position is opposed to the projecting piece 20. The valve passage 19 opens when the valve element 3 is located at an open position (see FIG. 1) where the seat portion 21 and the projecting piece 20 are separated from each other. With this, an orifice 22 is formed between the seat portion 21 and the projecting piece 20, and the pressure of the working gas flowing through the valve passage 19 is reduced by the orifice 22. By the orifice 22, the insertion hole 14 is divided into a primary region 23 located inside the orifice 22 and a secondary region 24 located outside the orifice 22. The primary region 23 and the secondary region 24 are blocked from each other when the seat portion 21 is seated on the projecting piece 20 (i.e., the valve element 3 is located at a closed position), and this closes the orifice 22. When the primary region 23 and the secondary region 24 are blocked from each other, the valve passage 19 is closed. A tubular reinforcing body 4, called a bushing, is externally attached to an intermediate portion of the valve element 3.

The tubular reinforcing body 4 is a thin, cylindrical member made of a material (i.e., a hard material) harder than the material of the valve element 3. One example of the hard material is chromium molybdenum steel subjected to gas carburizing quenching. The tubular reinforcing body 4 is externally attached and fixed to the intermediate portion of the valve element 3 by press fitting. However, the method of externally attaching the tubular reinforcing body 4 is not limited to the press fitting. The intermediate portion of the valve element 3 is reinforced by the tubular reinforcing body 4 and is inserted into the body 13 with the tubular reinforcing body 4 attached thereto. A bearing accommodating space 25 that is a substantially cylindrical space is formed at the body 13 at a position around the intermediate portion of the valve element 3. More specifically, an inner peripheral surface of the body 13 includes an inward flange 13c formed at the intermediate portion of the body 13 over the entire periphery in the circumferential direction, and the intermediate portion of the body 13 projects in a radially inner direction beyond a remaining portion of the body 13. With this, at a base end side of the body 13, the bearing accommodating space 25 that is a substantially cylindrical space is formed between the body 13 and the valve element 3. The ball bearing 5 is accommodated in the bearing accommodating space 25.

The ball bearing 5 is a so-called linear-motion ball guide and is formed in a substantially cylindrical shape. The ball bearing 5 is fittingly inserted in and fixed to an inner peripheral portion of the body 13 so as to be accommodated in the bearing accommodating space 25. The valve element 3 is inserted in the ball bearing 5 with the tubular reinforcing body 4 interposed therebetween. To be specific, the ball bearing 5 is externally attached to the tubular reinforcing body 4 attached to the intermediate portion of the valve element 3. With this, the valve element 3 is supported by the ball bearing 5 through the tubular reinforcing body 4 and can smoothly reciprocate in the upper-lower direction along the axis L1. According to prior art, since balls 5a of the ball bearing 5 are brought into contact with the surface of the valve element 3, and the valve element 3 is directly supported by the ball bearing 5, the surface of a base material of the valve element 3 made of the soft material is subjected to plating to be hardened. However, in some cases, the base material of the valve element 3 is dented by surface pressure applied from the balls 5a of the ball bearing 5, or the base material of the valve element 3 is damaged by peel-off of a plating layer formed on the surface of the valve element 3. By interposing the tubular reinforcing body 4, the balls 5a of the ball bearing 5 can roll on an outer surface of the tubular reinforcing body 4, and the surface pressure generated by the balls 5a can be received by the tubular reinforcing body 4 made of the hard material. Therefore, the base material of the valve element 3 can be prevented from deforming, and the durability of the valve element 3 can be improved.

As above, the intermediate portion of the valve element 3 is supported by the ball bearing 5 through the tubular reinforcing body 4 so as to be able to reciprocate. A tip end-side portion 3c of the valve element 3 is a portion (except for the tip end portion 3b) located at a tip end side of the tubular reinforcing body 4 and is inserted into the inward flange 13c of the body 13. A seal groove 26 is formed on an outer peripheral surface of the tip end-side portion 3c of the valve element 3 over the entire periphery in the circumferential direction.

A valve element seal 27, such as an O ring, is fitted in the seal groove 26. The valve element seal 27 contacts the inward flange 13c to seal between the tip end-side portion 3c and the inward flange 13c. To be specific, the tip end-side portion 3c of the valve element 3 is inserted in the inward flange 13c in a sealed state and is guided by the inward flange 13c so as to move along the axis L1.

The base portion 3a of the valve element 3 is a portion located at a base end side of the tubular reinforcing body 4. The base portion 3a of the valve element 3 projects from the body 13, and an outer diameter of the base portion 3a is substantially equal to an inner diameter of the cover 12. Therefore, an outer peripheral surface of the base portion 3a faces an inner peripheral surface of the cover 12, and a seal groove 28 is formed on the outer peripheral surface of the base portion 3a over the entire periphery in the circumferential direction. A valve element seal 29, such as an O ring, is fitted in the seal groove 28. The valve element seal 29 contacts the inner peripheral surface of the cover 12 to seal between the base portion 3a of the valve element 3 and the cover 12. To be specific, the base portion 3a of the valve element 3 is fitted in the inner peripheral surface of the cover 12 in a sealed state and is guided by the cover 12 so as to reciprocate along the axis L1.

A spring receiving portion 3d is formed at the base portion 3a of the valve element 3. The spring receiving portion 3d is formed at an outer peripheral edge portion of a lower surface of the base portion 3a and is arranged so as to be opposed to an upper surface of the flange 13b of the body 13. A cylindrical spring accommodating space 30 surrounded by the body 13 and the cover 12 is formed between the spring receiving portion 3d and the flange 13b. The spring member 6 is accommodated in the spring accommodating space 30. The spring member 6 is a so-called compression coil spring. Upper and lower end portions of the spring member 6 are supported by the spring receiving portion 3d of the base portion 3a and a spring receiving portion 13d of the body 13, respectively. The spring receiving portion 13d is an upper surface of the body 13. The spring member 6 is accommodated in the spring accommodating space 30 in a compressed state and biases the valve element 3 toward the open position. A secondary pressure (i.e., a pressure by which the valve element 3 is made to move toward the closed position) against the biasing force of the spring member 6 acts on the valve element 3. A concave space 31 is formed at the base portion 3a of the valve element 3 so as to receive the secondary pressure.

The concave space 31 is formed at an upper surface of the base portion 3a of the valve element 3 and extends along the axis L1. The concave space 31 is open toward a ceiling portion 12c of the cover 12, and a secondary pressure chamber 32 including the concave space 31 is formed between the base portion 3a of the valve element 3 and the ceiling portion 12c of the cover 12. The secondary pressure chamber 32 is isolated from the spring accommodating space 30 by the valve element seal 29 and is connected to the secondary region 24 by a communication hole 33 and an annular passage 34 which are formed at the valve element 3.

The communication hole 33 includes a communicating portion 33a and a connecting portion 33b. The communicating portion 33a extends from a bottom portion, defining the concave space 31, toward the tip end portion 3b of the valve element 3 along the axis L1 of the valve element 3. A tip end side of the communication hole 33 extends to a position close to the tip end portion 3b of the valve element 3, and the connecting portion 33b is connected to a tip end-side portion of the communication hole 33. The connecting portion 33b extends so as to penetrate the valve element 3 in a radial direction. Both ends of the connecting portion 33b are open at an outer peripheral portion of the valve element 3, i.e., at one side of the tip end-side portion 3c which side is located close to the tip end portion 3b. A portion of the valve element 3 which portion is located at the above side of the tip end-side portion 3b is smaller in diameter than the tip end-side portion 3c, and the annular passage 34 is formed between the above portion of the valve element 3 and the inner peripheral surface of the body 13. The communication hole 33 is connected to the secondary region 24 through the annular passage 34. To be specific, the secondary region 24 communicates with the secondary pressure chamber 32 by the annular passage 34 and the communication hole 33, and the working gas introduced to the secondary region 24 is introduced to the secondary pressure chamber 32 through the annular passage 34 and the communication hole 33.

A base end of the valve element 3 forms a pressure receiving surface 3e that receives the pressure (i.e., the secondary pressure) of the working gas introduced to the secondary pressure chamber 32. The valve element 3 is pushed toward the closed position by the secondary pressure. As above, the pressure receiving surface 3e of the valve element 3 receives the secondary pressure introduced to the secondary pressure chamber 32, and the biasing force of the spring member 6 and the secondary pressure act on the valve element 3 so as to act against each other.

According to the pressure regulator valve 1 configured as above, the spring accommodating space 30 is isolated from the secondary region 24 (i.e., the valve passage 19) by the valve element seal 27 and is isolated from the secondary pressure chamber 32 by the valve element seal 29. Therefore, since the gas (i.e., air) in the spring accommodating space 30 expands or contracts by the movement of the valve element 3, an atmosphere communication hole 35 is formed at the cover 12 in order to prevent such expansion and contraction. The atmosphere communication hole 35 opens the spring accommodating space 30 to the atmosphere. Thus, the air in the spring accommodating space 30 can be released to the atmosphere, and the air can be sucked from the atmosphere into the spring accommodating space 30. A cap member 36 is fitted and fixed to the atmosphere communication hole 35. The cap member 36 prevents a liquid, such as rain water, from flowing therethrough while allowing a gas, such as air, to flow therethrough. With this, a liquid, such as rain water, can be prevented from flowing into the spring accommodating space 30.

A gas seal 37 and a waterproof seal 38 are provided at the housing 2. Hereinafter, positions where the gas seal 37 and the waterproof seal 38 are arranged will be explained also with reference to FIG. 2. The gas seal 37 prevents the working gas from flowing out from the valve passage 19 to the cover 12, the atmosphere, and the like. The gas seal 37 is constituted by an O ring made of, for example, synthetic rubber and is externally attached to the tip end portion 13a of the body 13.

Figure 2:
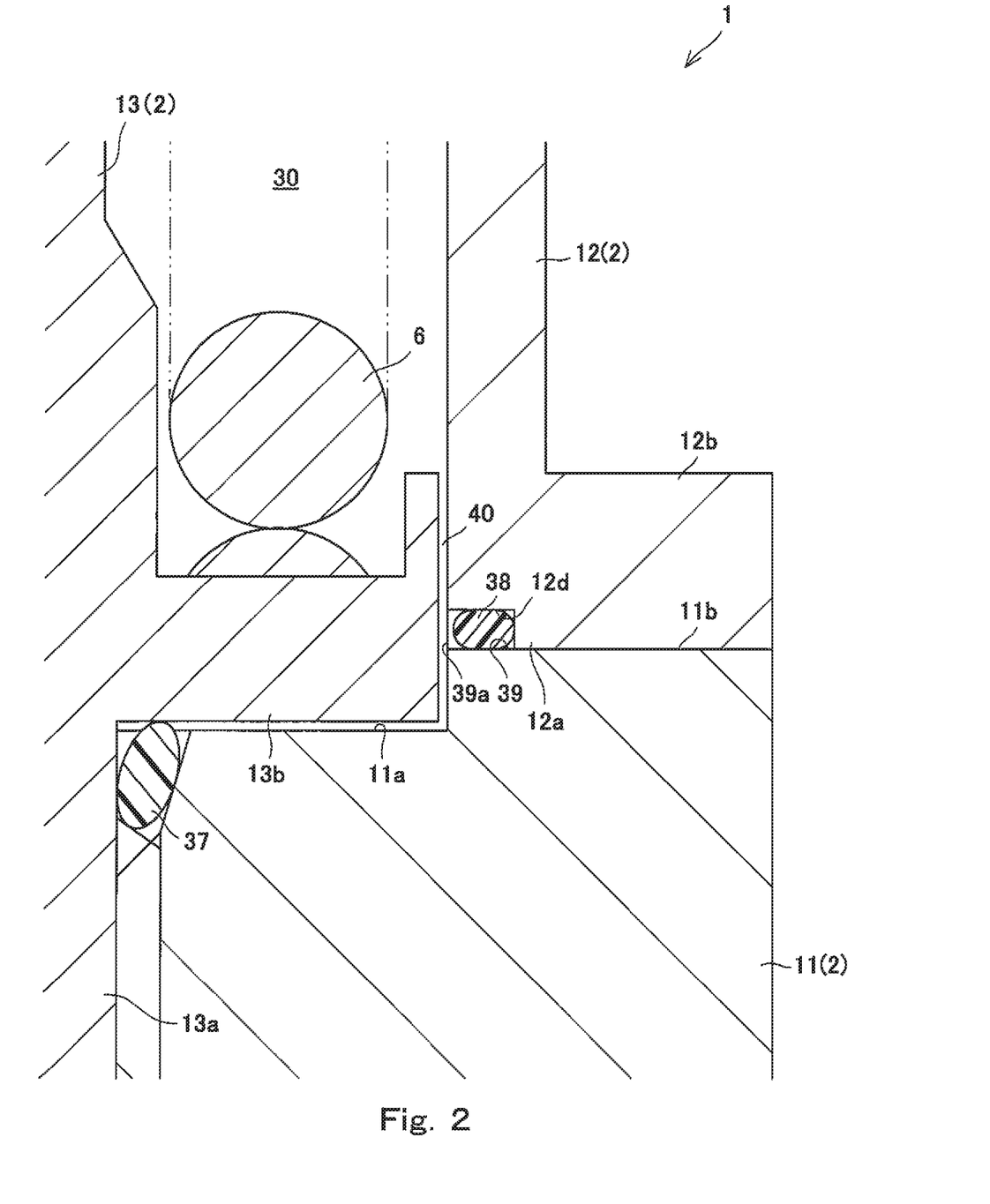
FIG. 2 is an enlarged sectional view showing a region X of the pressure regulator valve of FIG. 1.

More specifically, the gas seal 37 is externally attached to the tip end portion 13a of the body 13 while contacting the lower surface of the flange 13b of the body 13. When the body 13 is inserted into the insertion hole 14 and threadedly engaged with the base 11, the gas seal 37 is crushed by the tip end portion 13a, the flange 13b, and the base 11 to seal between the tip end portion 13a and the base 11. With this, the valve passage 19 can be isolated from the spring accommodating space 30 and the atmosphere by the gas seal 37, and the working gas flowing through the valve passage 19 can be prevented from flowing out to the spring accommodating space 30 and the atmosphere.

Figure 3:
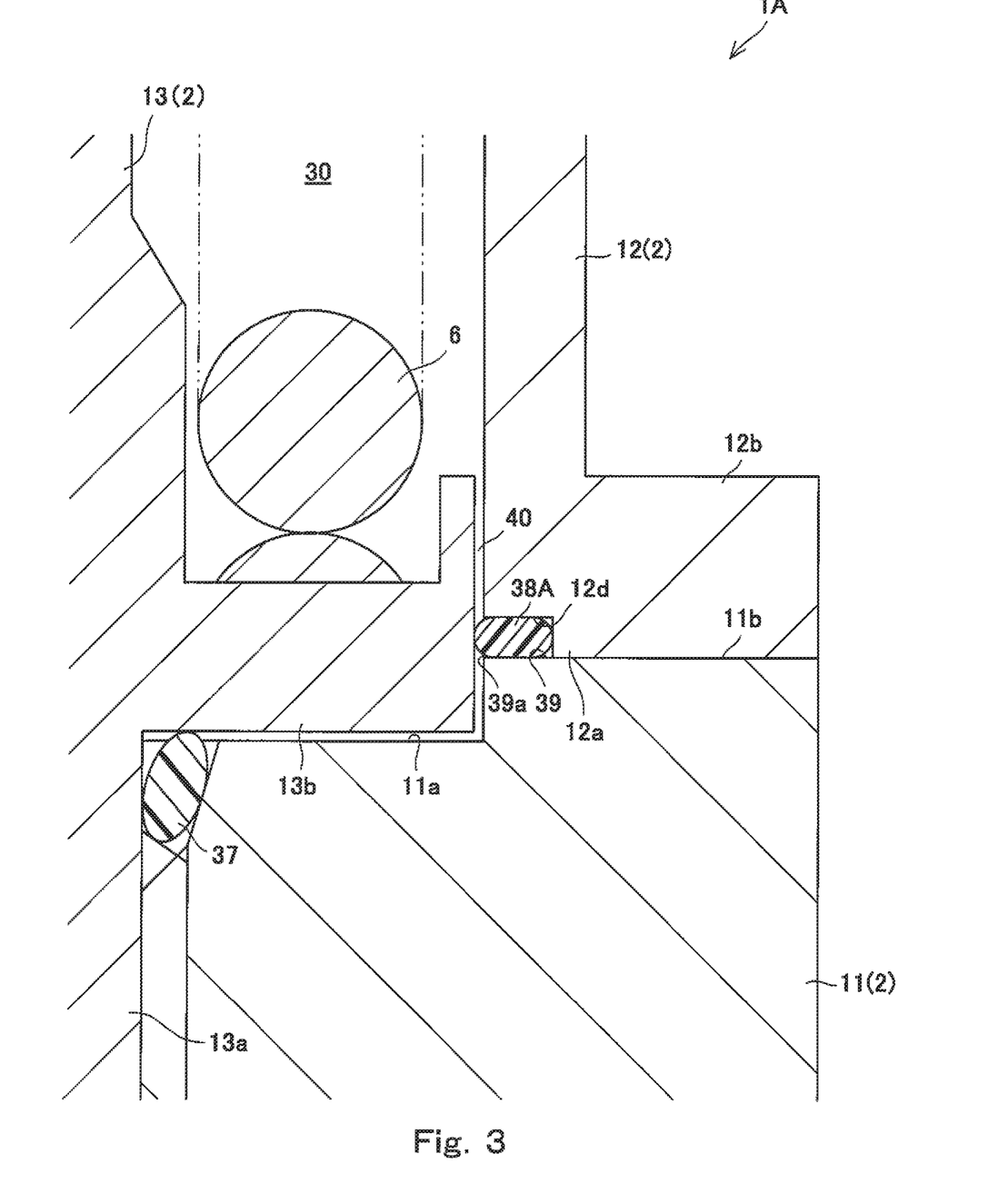
FIG. 3 is an enlarged sectional view showing a part of the pressure regulator valve of Embodiment 2.

The waterproof seal 38 prevents a liquid, such as rain water, from flowing into the pressure regulator valve 1 and is constituted by an O ring made of, for example, synthetic rubber. A seal accommodating space 39 at which the waterproof seal 38 is arranged is formed at the housing 2. More specifically, as shown in FIG. 3, a step portion 12d is formed at an inner peripheral edge of the opening end portion 12a of the cover 12 of the housing 2. By bringing the opening end portion 12a of the cover 12 into contact with the step upper portion 11b of the base 11, the seal accommodating space 39 is formed by the step portion 12d. The seal accommodating space 39 is an annular space formed at an inner peripheral surface of the housing 2 over the entire periphery in the circumferential direction. The seal accommodating space 39 includes a surface opening 39a located at a radially inner side and facing an outer peripheral surface of the flange 13b of the body 13. An annular gap 40 is formed between the outer peripheral surface of the flange 13b and the inner peripheral surface of the cover 12, and the seal accommodating space 39 faces the gap 40.

The waterproof seal 38 is accommodated in the seal accommodating space 39 formed as above and is arranged so as not to close the gap 40. To be specific, the waterproof seal 38 is formed such that: an inner diameter thereof is larger than an inner diameter of the cover 12; and even when the waterproof seal 38 is accommodated in the seal accommodating space 39 and crushed by the cover 12 and the base 11, at least a part of the waterproof seal 38 does not contact the outer peripheral surface of the flange 13b. In the present embodiment, the waterproof seal 38 is formed so as to be separated from the outer peripheral surface of the flange 13b over the entire periphery in the circumferential direction. With this, the waterproof seal 38 can seal between the flange 12b of the cover 12 and the step upper portion 11b of the base 11 without closing the gap 40 between the outer peripheral surface of the flange 13b and the inner peripheral surface of the cover 12. Thus, a liquid, such as rain water, can be prevented from flowing from between the flange 12b and the step upper portion 11b into the valve passage 19 and the spring accommodating space 30, and the gas leaking from the gas seal 37 can be introduced to the spring accommodating space 30 to be released to the atmosphere through the atmosphere communication hole 35. Therefore, a pressure increase caused when the working gas leaking from the gas seal 37 is accumulated between the flange 13b and the concave portion 11a can be prevented from occurring, and the body 13 can be prevented from being lifted by the pressure increase.

Operations of Pressure Regulator Valve

Hereinafter, operations of the pressure regulator valve 1 in reducing the pressure of the working gas, such as a high-pressure gas, introduced to the primary port 15a will be explained with reference to FIG. 1. Examples of the working gas include a corrosive gas (such as a sulfur gas) and a non-corrosive gas (such as high-pressure air). Since the valve element 3 is being biased in an open direction by the spring member 6, the pressure regulator valve 1 is normally open, and the high-pressure gas introduced to the primary port 15a is introduced through the orifice 22 to the secondary region 24. When the high-pressure gas flows through the orifice 22, the pressure of the high-pressure gas is reduced from the primary pressure to the secondary pressure. Then, the gas is introduced to the secondary region 24 to be supplied through the secondary passage 16 and the secondary port 16a to a downstream device.

The gas having the low pressure reduced as above is also introduced through the annular passage 34 and the communication hole 33 to the secondary pressure chamber 32 in addition to the secondary passage 16. With this, the secondary pressure acts on the pressure receiving surface 3e of the valve element 3 to push the valve element 3 toward the closed position. With this, the valve element 3 moves in such a direction as to close the orifice 22. Thus, the valve element 3 moves to a position where an acting force generated by the secondary pressure received by the pressure receiving surface 3e, the biasing force of the spring member 6, and other forces acting on the valve element 3 are balanced. For example, when the secondary pressure decreases, the acting force acting on the pressure receiving surface 3e decreases, and the biasing force of the spring member 6 exceeds the acting force acting on the pressure receiving surface 3e. In this case, in order to keep the balance between the acting force acting on the pressure receiving surface 3e and the biasing force of the spring member 6, the valve element 3 moves toward the open position to open the orifice 22. With this, the secondary pressure increases and is kept at a set pressure.

According to the pressure regulator valve 1, since the ball bearing 5 is adopted as a member supporting the valve element 3, the valve element 3 can smoothly reciprocate, and therefore, the responsiveness can be improved. Further, according to the pressure regulator valve 1, as described above, the ball bearing 5 supports the valve element 3 through the tubular reinforcing body 4. Therefore, even when the valve element 3 receives significant surface pressure from the balls 5a, the valve element 3 can be prevented from deforming. With this, the valve element 3 does not have to be subjected to a hardening treatment, and the valve element 3 can be prevented from being damaged.

Embodiment 2

The pressure regulator valve 1A of Embodiment 2 is similar in configuration to the pressure regulator valve 1 of Embodiment 1. Hereinafter, components of the pressure regulator valve 1A which are different from the components of the pressure regulator valve 1 of Embodiment 1 will be mainly explained, and explanations of the same components are omitted.

According to the pressure regulator valve 1A of Embodiment 2, a waterproof seal 38A is formed such that an inner diameter thereof is substantially equal to the outer diameter of the flange 13b. The waterproof seal 38A is accommodated in the seal accommodating space 39 while being crushed by the cover 12 and the base 11. While being crushed by the cover 12 and the base 11, the waterproof seal 38A contacts the outer peripheral surface of the flange 13b over the entire periphery in the circumferential direction. With this, the waterproof seal 38A can seal between the flange 12b of the cover 12 and the step upper portion 11b of the base 11 and close the gap 40 between the outer peripheral surface of the flange 13b and the inner peripheral surface of the cover 12.

The waterproof seal 38A arranged as above is made of a porous material, such as porous PTFE. The waterproof seal 38A can prevent a liquid, such as rain water, from flowing therethrough and allow the working gas to flow therethrough. To be specific, the waterproof seal 38A includes therein a channel through which the working gas flows. Therefore, the flow of a liquid, such as rain water, from between the flange 12*b* and the step upper portion 11*b* into the valve passage 19 and the spring accommodating space 30 can be prevented by the waterproof seal 38A, and the gas leaking from the gas seal 37 can be released to the atmosphere from between the flange 12*b* and the step upper portion 11*b*. The atmosphere flowing into between the flange 12*b* and the step upper portion 11*b* can be made to flow into the spring accommodating space 30 through an inside of the waterproof seal 38A and the gap 40, and in contrast, the gas (such as air) in the spring accommodating space 30 can be released to the atmosphere through the gap 40 and the inside of the waterproof seal 38A. With this, when the volume of the spring accommodating space 30 changes by the movement of the valve element 3, the gas can be taken into the spring accommodating space 30 through the gap 40 from the atmosphere, or the gas in the spring accommodating space 30 can be released to the atmosphere through the gap 40. Therefore, the atmosphere communication hole 35 and the cap member 36 can be omitted, and this can reduce the number of parts. It should be noted that the atmosphere communication hole 35 and the cap member 36 do not have to be omitted and may be formed and provided at the cover 12 as with the pressure regulator valve 1 of Embodiment 1.

Further, since the waterproof seal 38A is arranged so as to contact the flange 13*b*, the waterproof seal 38A can be arranged so as to be fitted to the flange 13*b*. With this, the waterproof seal 38A is easily positioned, and the waterproof seal 38A can be easily attached.

The pressure regulator valve 1A of Embodiment 2 has the same operational advantages as the pressure regulator valve 1 of Embodiment 1.

Other Embodiment

Figure 4:
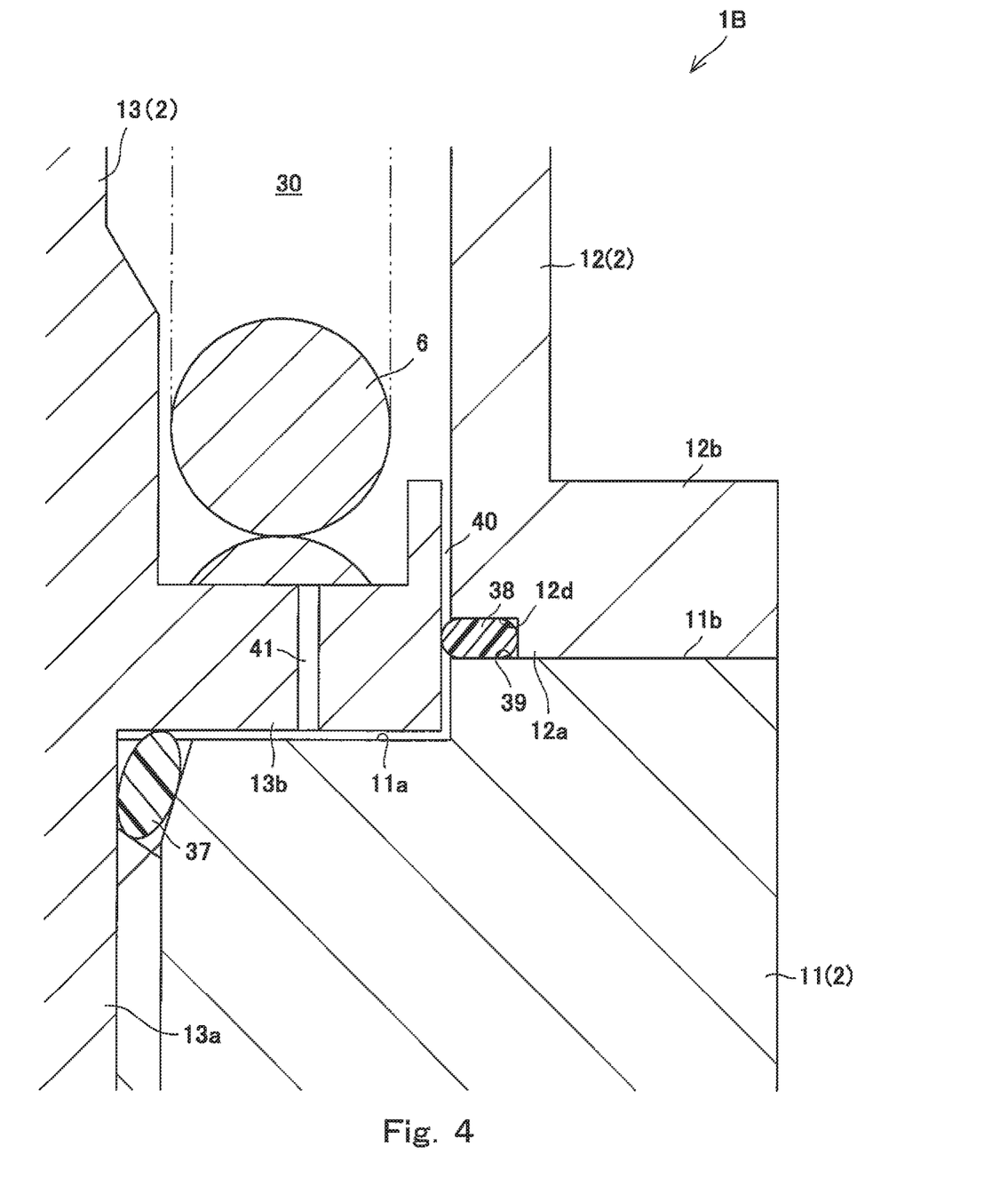
FIG. 4 is an enlarged sectional view showing a part of the pressure regulator valve of Other Embodiment.

According to the pressure regulator valve 1 of Embodiment 1, in order not to close the gap 40, the shape of the waterproof seal 38 is designed, and the waterproof seal 38 is arranged. However, as in a pressure regulator valve 1B shown in FIG. 4, the gap 40 may be closed by the waterproof seal 38. In this case, a pressure release hole 41 is formed at the flange 13*b*. With this, the gas accumulated between the gas seal 37 and the waterproof seal 38 can be released to the spring accommodating space 30 through the pressure release hole 41. Thus, the pressure regulator valve having the same operational advantages as the pressure regulator valve 1 of Embodiment 1 can be configured. Further, the gap 40 does not necessarily have to be aggressively formed as in FIG. 2. To be specific, the gap 40 may be a slight gap formed when two members are brought into contact with each other. The gap 40 is only required to be a gap through which a gas flows.

According to the pressure regulator valves 1, 1A, and 1B of Embodiments 1, 2, and 3, the flange 13*b* is formed at the body 13. However, the flange 13*b* does not necessarily have to be formed. In this case, the outer peripheral surface of the body 13 is fitted to the cover 12.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1, 1A, 1B pressure regulator valve
2 housing
3 valve element
6 spring member
11 base
12 cover
13 body
14*a* opening
15 primary passage
16 secondary passage
19 valve passage
30 spring accommodating chamber
36 cap member (sealing member)
37 gas seal (first sealing member)
38, 38A waterproof sealing member (second sealing member)
41 pressure release hole

The invention claimed is:

1. A pressure regulator valve comprising:
a housing including
a base including a valve passage through which a working gas flows,
a tubular body attached to the base, and
a cover attached to the base so as to cover the body;
a valve element configured to open and close the valve passage by moving between a closed position where the valve element closes the valve passage and an open position where the valve element opens the valve passage, the valve element being further configured to reduce a primary pressure to a secondary pressure and receive the secondary pressure by which the valve element moves toward the closed position;
a biasing unit accommodated in an accommodating space formed between the body and the cover, the biasing unit being configured to bias the valve element such that the valve element moves toward the open position;
a first sealing member provided between the base and the body; and
a second sealing member provided between the base and the cover and made of synthetic rubber, wherein
the second sealing member is arranged away from the body, and
an annular gap communicating with the accommodating space is formed between an outermost outer peripheral surface of the body and an inner peripheral surface of the cover.

2. The pressure regulator valve according to claim 1, wherein:
the cover includes an atmosphere communication hole through which the accommodating space communicates with an atmosphere;
the atmosphere communication hole is closed by a sealing member; and
the sealing member allows a gas to flow therethrough and prevents a liquid from flowing therethrough.

3. A pressure regulator valve comprising:
a housing including
a base including a valve passage through which a working gas flows,
a tubular body attached to the base, and
a cover attached to the base so as to cover the body;
a valve element configured to open and close the valve passage by moving between a closed position where the valve element closes the valve passage and an open position where the valve element opens the valve passage, the valve element being further configured to reduce a primary pressure to a secondary pressure and receive the secondary pressure by which the valve element moves toward the closed position;

a biasing unit accommodated in an accommodating space formed between the body and the cover, the biasing unit being configured to bias the valve element such that the valve element moves toward the open position;

a first sealing member provided between the base and the body to seal the valve passage; and a second sealing member provided between the base and the cover, wherein:

the second sealing member is made of a porous material which allows a gas to flow therethrough and prevents a liquid from flowing therethrough; and the second sealing member is arranged so as to contact the body.

4. A pressure regulator valve comprising:

a housing including
   a base including a valve passage through which a working gas flows,
   a tubular body attached to the base, and
   a cover attached to the base so as to cover the body;

a valve element configured to open and close the valve passage by moving between a closed position where the valve element closes the valve passage and an open position where the valve element opens the valve passage, the valve element being further configured to reduce a primary pressure to a secondary pressure and receive the secondary pressure by which the valve element moves toward the closed position;

a biasing unit accommodated in an accommodating space formed between the body and the cover, the biasing unit being configured to bias the valve element such that the valve element moves toward the open position;

a first sealing member provided at a gap between the base and the body; and a second sealing member provided at a gap between the base and the cover and made of synthetic rubber, wherein:

the second sealing member is arranged so as to contact the body; and the body includes a pressure release hole connecting the accommodating space and a gap between the base and the body, the gap being a portion located at an opposite side of the valve passage across the first sealing member.

\* \* \* \* \*